US012640950B2

(12) United States Patent
Yamauchi et al.

(10) Patent No.: US 12,640,950 B2
(45) Date of Patent: May 26, 2026

(54) TARGET NODE SELECTION TO WAKE-UP WITH REQUESTING NODE

(71) Applicant: DENSO CORPORATION, Kariya-city (JP)

(72) Inventors: Mao Yamauchi, Kariya-city (JP); Tomohisa Kishigami, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 63 days.

(21) Appl. No.: 18/911,336

(22) Filed: Oct. 10, 2024

(65) Prior Publication Data

US 2025/0175358 A1 May 29, 2025

(30) Foreign Application Priority Data

Nov. 24, 2023 (JP) ................................. 2023-199085

(51) Int. Cl.
H04L 12/12 (2006.01)
H04L 12/40 (2006.01)
(52) U.S. Cl.
CPC ........ H04L 12/12 (2013.01); H04L 12/40039 (2013.01)
(58) Field of Classification Search
CPC ........................... H04L 12/12; H04L 12/40039
USPC ....................................................... 709/224
See application file for complete search history.

(56) References Cited

U.S. PATENT DOCUMENTS

| | | | | |
|---|---|---|---|---|
| 12,498,917 | B2 * | 12/2025 | Choi | G06F 8/65 |
| 2024/0340354 | A1 * | 10/2024 | Wakabayashi | H04L 67/12 |

FOREIGN PATENT DOCUMENTS

| | | | | | |
|---|---|---|---|---|---|
| CN | 108260186 | A | * | 7/2018 | H04W 48/16 |
| CN | 114651500 | A | * | 6/2022 | H04W 68/02 |
| CN | 118784717 | A | * | 10/2024 | H04L 12/10 |
| JP | 2009-124480 | A | | 6/2009 | |
| JP | 7664985 | B2 | * | 4/2025 | H05K 7/20009 |

* cited by examiner

*Primary Examiner* — David P Zarka
(74) *Attorney, Agent, or Firm* — Posz Law Group, PLC

(57) ABSTRACT

An in-vehicle network system includes a relay device connecting communication lines to each other and nodes connected to the communication lines. Each of the nodes is configured to enter a wake-up state when the node in the sleep state receives a wake-up signal through the communication line. At least one of the nodes as a requesting node is configured to transmit the wake-up signal. Activation target data is set for each of the nodes. The activation target data for one node indicates at least one other node that is required to activate together with the one node. The relay device obtains the activation target data for the requesting node when receiving the wake-up signals from the requesting node, synthesize the activation target data to generate activation request data, select a target node in accordance with the activation request data, and transmit the wake-up signal to the target node.

15 Claims, 17 Drawing Sheets

| ACTIVATION INFORMATION TABLE | | | | | | |
|---|---|---|---|---|---|---|
| PORT NUMBER | NODE ID DATA (NODE ID/MAC ADDRESS) | PNI DATA (ACTIVATION TARGET DATA) | | | | |
| P0 | NODE A | 0 | 0 | ... | 1 | |
| P0 | NODE B | 0 | 0 | ... | 1 | |
| ... | ... | ... | ... | ... | ... | |
| P1 | NODE F | 0 | 0 | ... | 1 | |
| P2 | NODE G | 1 | 0 | ... | 0 | |
| ... | ... | ... | ... | ... | ... | |

TARGET NODE SELECTION TO WAKE-UP WITH REQUESTING NODE

CROSS REFERENCE TO RELATED APPLICATION

The present application claims the benefit of priority from Japanese Patent Application No. 2023-199085 filed on Nov. 24, 2023. The entire disclosure of the above application is incorporated herein by reference.

TECHNICAL FIELD

The present disclosure relates to in-vehicle network systems.

BACKGROUND

There is a partial network technique that selectively controls wake-up/sleep states of multiple ECUs.

SUMMARY

According to one aspect of the present disclosure, an in-vehicle network system is provided. The in-vehicle network includes a relay device connecting communication lines to each other and nodes each of which is connected to any one of the communication lines and configured to communicate with each other. Each of the nodes has a wake-up state which is a normal operation state and a sleep state which is a low power consumption state where at least one of functions is disabled. Each of the nodes is configured to enter the wake-up state when the node in the sleep state receives a wake-up signal through the communication line. At least one of the nodes is configured to transmit the wake-up signal when a predetermined activation condition is met. The at least one of the nodes includes a first requesting node and a second requesting node. Activation target data is set for each of the nodes in advance, and the activation target data for one node indicates at least one other node that is required to activate together with the one node. The relay device is configured to obtain the activation target data for the first requesting node and the activation target data for the second requesting node when receiving, during a predetermined obtaining period, the wake-up signals from the first and second requesting nodes through the communication lines. Then, the relay device is configured to synthesize the activation target data for the first requesting node and the activation target data for the second requesting node to generate activation request data collectively indicating the at least one other node for the first requesting node and the at least one other node for the second requesting node. The relay device is further configured to select, in accordance with the activation request data, a target node that is required to enter the wake-up state from the sleep state together with any one of the first requesting node and the second requesting node, and transmit the wake-up signal that designates the target node.

According to another aspect of the present disclosure to provide a relay device connecting communication lines to each other. Each of the communication lines is connected to at least one of nodes. The relay device includes exchange circuits, a signal transfer unit, and a wake-up control unit. The exchange circuits are installed respectively for the communication lines and configured to exchange signals through the communication lines. The signal transfer unit is configured to transfer a communication frame having received from any one of the exchange circuits to another one of the exchange circuits. At least one of the nodes is configured to transmit a wake-up signal and the at least one of the nodes includes a first requesting node and a second requesting node. Activation target data is set for each of the nodes in advance, and the activation target data for one node indicates at least one other node that is required to activate with the one node. The wake-up control unit is configured to obtain the activation target data for the first requesting node and the activation target data for the second requesting node when receiving, during a predetermined obtaining period, the wake-up signals from the first and second requesting nodes through the exchange circuits. The wake-up control unit is further configured to synthesize the activation target data for the first requesting node and the activation target data for the second requesting node to generate activation request data collectively indicating the at least one other node for the first requesting node and the at least one other node for the second requesting node. The wake-up control unit is further configured to select, in accordance with the activation request data, a target node that is required to enter a wake-up state, which is a normal operation state, from a sleep state, which is a low power consumption state where at least one of functions is disabled, and transmit the wake-up signal that designates the target node through at least one of the exchange circuits.

BRIEF DESCRIPTION OF THE DRAWINGS

FIG. 4 is an explanatory diagram showing the configuration of an activation information table.

DETAILED DESCRIPTION OF THE PREFERRED EMBODIMENTS

Figure 1:
FIG. 1 is a block diagram showing an overall configuration of an in-vehicle network system.

To begin with, examples of relevant techniques will be described.

There is a partial network technique that selectively controls wake-up/sleep states of multiple ECUs, such as a technology regarding a relay device that relays data transmission and reception between different networks. When the relay device receives a wake-up signal from a node on one network, the relay device determines whether to transmit a wake-up signal to other network based on data contained in the received wake-up signal.

However, such technique assumes that a wake-up signal is transmitted on a network basis. Thus, all nodes on the same network are activated, resulting in unnecessary power consumption.

Furthermore, the wake-up signal is transferred between networks by a relay function realized by computer processing. Therefore, when the relay device is in a sleep state, the wake-up signal cannot be transferred until the computer activates, which causes a long activation time for the entire system.

One aspect of the present disclosure is to provide a technique for reducing power consumption of the in-vehicle network system and shortening the activation time.

One aspect of the present disclosure is to provide an in-vehicle network system including a relay device and multiple nodes. The relay device connects communication lines to each other.

Each of the nodes is connected to any one of the communication lines and communicates with each other. Each of the nodes has a wake-up state, which is a normal operation state, and a sleep state, which is a low power consumption state where at least one of functions is disabled. Each of the nodes is configured to enter the wake-up state when the node in the sleep state receives a wake-up signal through the communication line. At least one of the nodes is configured to transmit the wake-up signal when a predetermined activation condition is met. The at least one of the nodes include a first requesting node and a second requesting node.

The relay device is configured to obtain activation target data for the first requesting node and activation target data for the second requesting node when receiving, during a predetermined obtaining period, the wake-up signals from the first and second requesting nodes through the communication lines. The relay device is configured to synthesize the activation target data for the first requesting node and the activation target data for the second requesting node to generate activation request data. The relay device is further configured to select, in accordance with the activation request data, a target node that is required to enter the wake-up state from the sleep state together with any one of the first requesting node and the second requesting node. The relay device is configured to transmit the wake-up signal to the target node.

The requesting node is a node that originates the wake-up signal. Activation target data is set for each of the nodes in advance. The activation target data for one node indicates at least one other node that is required to activate together with the one node. The target node is a node that is required to enter the wake-up state from the sleep state.

The configuration described above can selectively and collectively activate nodes that need to activate with the requesting node as a group including at least one node. Thus, unnecessary nodes are prevented from activating, thereby reducing power consumption of the in-vehicle network system. In addition, a control of waking up nodes does not need a function of relaying a communication frame, thereby reducing delays in system activation.

One aspect of the present disclosure is to provide a relay device that connects communication lines to each other. Each of the communication lines is connected to at least one of nodes. The relay device includes exchange circuits, a signal transfer unit, and a wake-up control unit.

The exchange circuits are installed respectively for the communication lines and configured to exchange signals through the communication lines. The signal transfer unit is configured to transfer a communication frame having received from any one of the exchange circuits to another one of the exchange circuits.

The wake-up control unit is configured to obtain activation target data for a first requesting node and activation target data for a second requesting node when receiving, during a predetermined obtaining period, a wake-up signal from the first requesting node and a wake-up signal from the second requesting node through the exchange circuits, synthesize the activation target data for the first requesting node and the activation target data for the second requesting node to generate activation request data, select a target node in accordance with the activation request data, and transmit the wake-up signal to the target node through at least one of the exchange circuits.

The requesting node is the node that originates the wake-up signal. The activation target data is set for each of the nodes. The activation target data for one node indicates at least one other node that is required to activate with the one node. The target node is a node that is required to enter the wake-up state from the sleep state.

The configuration described above can selectively and collectively start nodes that is required to activate with the requesting node as a group including at least one node. Further, wake-up signals are prevented from being transmitted to the same node repeatedly. The control of waking up a node can be executed without relying on the signal transfer unit.

Hereinafter, embodiments of the present disclosure will be described with reference to the drawings.

1. First Embodiment

1-1. Configuration

An in-vehicle network system 100 shown in FIG. 1 includes a relay device 1. The relay device 1 connects a first network 7 and a second network 8 to each other.

The relay device 1 includes a CAN transceiver 2 and a switch hub 3. CAN is an abbreviation for Controller Area Network. CAN is a registered trademark. The CAN transceiver 2 is connected to the first network 7, and transmits and receives communication frames according to a CAN protocol. The switch hub 3 is connected to the second network 8, and transmits and receives communication frames according to an Ethernet protocol. Ethernet is a registered trademark.

The first network 7 forms a multi-drop network in which multiple nodes 72 (hereinafter, referred to as CAN nodes) are connected through a single communication line 71 (hereinafter, referred to as a CAN bus). The multiple CAN nodes 72 communicate with each other through the CAN bus 71 in accordance with the CAN protocol. Hereinafter, the first network 7 will also be referred to as a CAN-NW 7. The number of the CAN nodes 72 connected to the single CAN bus 71 may be one.

The second network 8 includes multiple communication lines 81 (hereinafter, referred to as Ethernet transmission lines) each connected to respective one of multiple ports of the switch hub 3. The second network 8 forms a star-shaped network in which multiple nodes 82 (hereinafter, referred to as Ethernet nodes) are connected through the multiple Ethernet transmission lines 81. The Ethernet nodes 82 execute communication in accordance with the Ethernet protocol via the Ethernet transmission lines 81 and the switch hub 3. Hereinafter, the second network 8 will be also referred to as an Ethernet-NW 8. The number of the Ethernet nodes 82 may be one and the number of the Ethernet transmission lines 81 may be one.

Hereinafter, the CAN nodes 72 and the Ethernet nodes 82 will be simply referred to as nodes 72, 82 when there is no need to distinguish between them. The nodes 72 and 82 have two operation states: a wake-up state and a sleep state.

The wake-up state is a normal operation state in which all functions assigned to the nodes 72, 82 can be used. The sleep state is a low power consumption state in which at least one of the functions is disabled. Specifically, during the sleep state, functions other than the function of executing processing related to waking up the nodes 72 and 82 may be disabled.

The nodes 72 and 82 each includes an ECU and a constantly operating unit. The ECU is a component that includes a computer equipped with a CPU and a memory. Here, the state in which the ECU is stopped is the sleep state, and the state in which the ECU is activated is the wake-up state. The constantly operating unit is a part configured by hardware without including a computer, and operates even in the sleep state to realize at least the function related to waking up the own node.

The CAN-NW 7 transmits and receives CAN frames. The CAN frame includes a frame used as a wake-up signal. The header field of the CAN frame used as a wake-up signal identifies the CAN frame as a wake-up signal. Furthermore, the header field of the wake-up signal indicates a node ID that is uniquely assigned to each node so that a node that requests wake-up, which is a requesting node, can be identified. The data field of the wake-up signal contains activation request data that indicates a node or a group of nodes that is required to activate.

The CAN node 72 in the wake-up state enters the sleep state when a sleep condition is satisfied. When the CAN node 72 in the sleep state receives, through the CAN bus 71, a wake-up signal containing the activation request data that indicates the own node or the group to which the own node belongs as a target, the CAN node 72 enters the wake-up state.

In addition, when a predetermined activation condition is met, such as that an activation trigger happens in the own node, the CAN node 72 in the sleep state enters the wake-up state and transmits a wake-up signal in which the node ID and PNI data of the own node are set as activation request data. The PNI data is data that indicates at least one node or a group of nodes that is required to activate together with the own node, and will be described in detail later.

The Ethernet-NW 8 uses an activation request/instruction signal including a wake-up pulse as the wake-up signal. The wake-up pulse is, for example, a pulse signal having a pulse width that is much wider than the pulse used in the line code. When a sleep condition is met, the Ethernet node 82 in the wake-up state enters the sleep state. When the Ethernet node

82 in the sleep state receives a wake-up pulse via the Ethernet transmission line 81, the Ethernet node 82 enters the wake-up state. Further, when an activation trigger happens in the Ethernet node 82 in the sleep state, the Ethernet node 82 enters the wake-up state and transmits a wake-up pulse to the Ethernet transmission line 81.

The sleep conditions may include, for example, that a certain period of time has passed without communications in the own node and that the node receives a communication frame that instructs a transition to the sleep state. The activation trigger may include, for example, detecting a particular vehicle operation, such as operating a door handle.

The CAN transceiver 2 is an exchange circuit that realizes the function of the physical layer in the CAN. The CAN transceiver 2 has a port P0 to which the CAN bus 71 is connected, and exchanges CAN frames with the CAN nodes 72. The CAN transceiver 2 has a function of decoding an encoded signal transmitted via the CAN bus 71 into a digital signal and a function of encoding the digital signal into a transmission signal and transmitting the transmission signal to the CAN bus 71.

The switch hub 3 has multiple ports P1 to PN to which the Ethernet transmission lines 81 are connected respectively, and exchange Ethernet frames with the Ethernet nodes 82 connected to the Ethernet transmission lines 81. N is an integer greater than or equal to 2. The switch hub 3 is also connected to the CAN transceiver 2.

Figure 2:
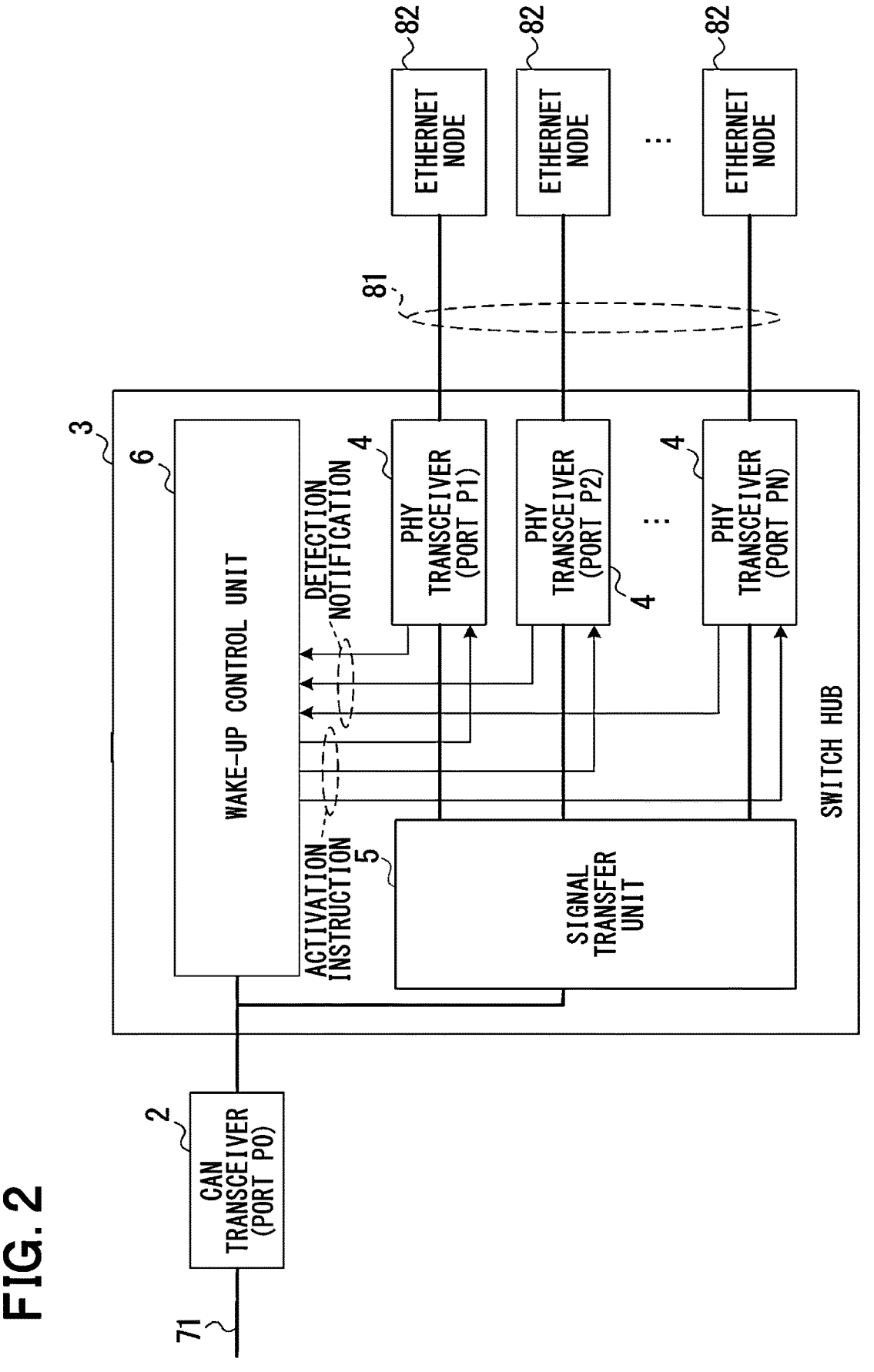
FIG. 2 is a block diagram showing a configuration of a relay device.

As shown in FIG. 2, the switch hub 3 includes multiple PHY transceivers 4, a signal transfer unit 5, and a wake-up control unit 6. The signal transfer unit 5 includes a computer equipped with a CPU and a memory. At least one of the functions of the signal transfer unit 5 is realized by processing executed by the CPU.

The parts of the switch hub 3 other than the signal transfer unit 5 (i.e., the PHY transceivers 4 and the wake-up control unit 6) and the CAN transceiver 2 do not include a computer and are configured by hardware. In particular, the CAN transceiver 2 and the PHY transceivers 4 may be configured using commercially available semiconductor integrated circuits.

The relay device 1 has the sleep state and the wakeup state like the nodes 72 and 82. Similar to the ECUs of the nodes 72 and 82, the state in which the signal transfer unit 5 is stopped is the sleep state, and the state in which the signal transfer unit 5 is activated is the wake-up state. The CAN transceiver 2, the PHY transceivers 4, and the wake-up control unit 6 operate even in the sleep state, like the constantly operating units of the nodes 72 and 82.

The PHY transceivers 4 are exchange circuits that realize the physical layer function of the Ethernet. The PHY transceivers 4 are installed respectively for the multiple ports P1 to PN to which the Ethernet transmission lines 81 are connected. The PHY transceivers 4 have a function of decoding an encoded signal transmitted through the Ethernet transmission lines 81 into a digital signal, and a function of encoding the digital signal into a transmission signal and transmitting the transmission signal to the Ethernet transmission lines 81.

When each of the PHY transceivers 4 detects the wake-up pulse on the Ethernet transmission line 81, the PHY transceiver 4 outputs, to the wake-up control unit 6, a detection notification indicating that a wake-up pulse has been detected. Further, when each of the PHY transceivers 4 receives an activation instruction from the wake-up control unit 6, the PHY transceiver 4 transmits a wake-up pulse to the Ethernet transmission lines 81.

The signal transfer unit 5 has a protocol conversion function. That is, when the signal transfer unit 5 receives a communication frame through any one of the PHY transceivers 4, the signal transfer unit 5 identifies the port to which the node that is the destination of the communication frame is connected from the MAC address of the node using the MAC address table. The signal transfer unit 5 transmits the communication frame to the specified port. However, when the node that is the destination of the communication frame is the CAN node 72, the signal transfer unit 5 performs a protocol conversion from Ethernet to CAN and transfers the communication frame to the CAN transceiver 2.

When the signal transfer unit 5 receives a CAN frame through the CAN transceiver 2, the signal transfer unit 5 identifies the port to which the node that is the destination of the CAN frame is connected from the node ID of the node indicated in the header field of the CAN frame. When the specified node is one of the Ethernet nodes 82, the signal transfer unit 5 performs a protocol conversion from CAN to Ethernet and transmits the communication frame to the specified port.

The signal transfer unit 5 may have a function of, when receiving a communication frame including table update data in the data field, extracting the table update data from the data field and outputting the table update data to the wake-up control unit 6. In addition, the signal transfer unit 5 may have a function of, when receiving a communication frame including equipment determination data in the data field, extracting the equipment determination data from the data field and outputting the equipment determination data to the wake-up control unit 6. The table update data and the equipment determination data will be described later.

Figure 3:
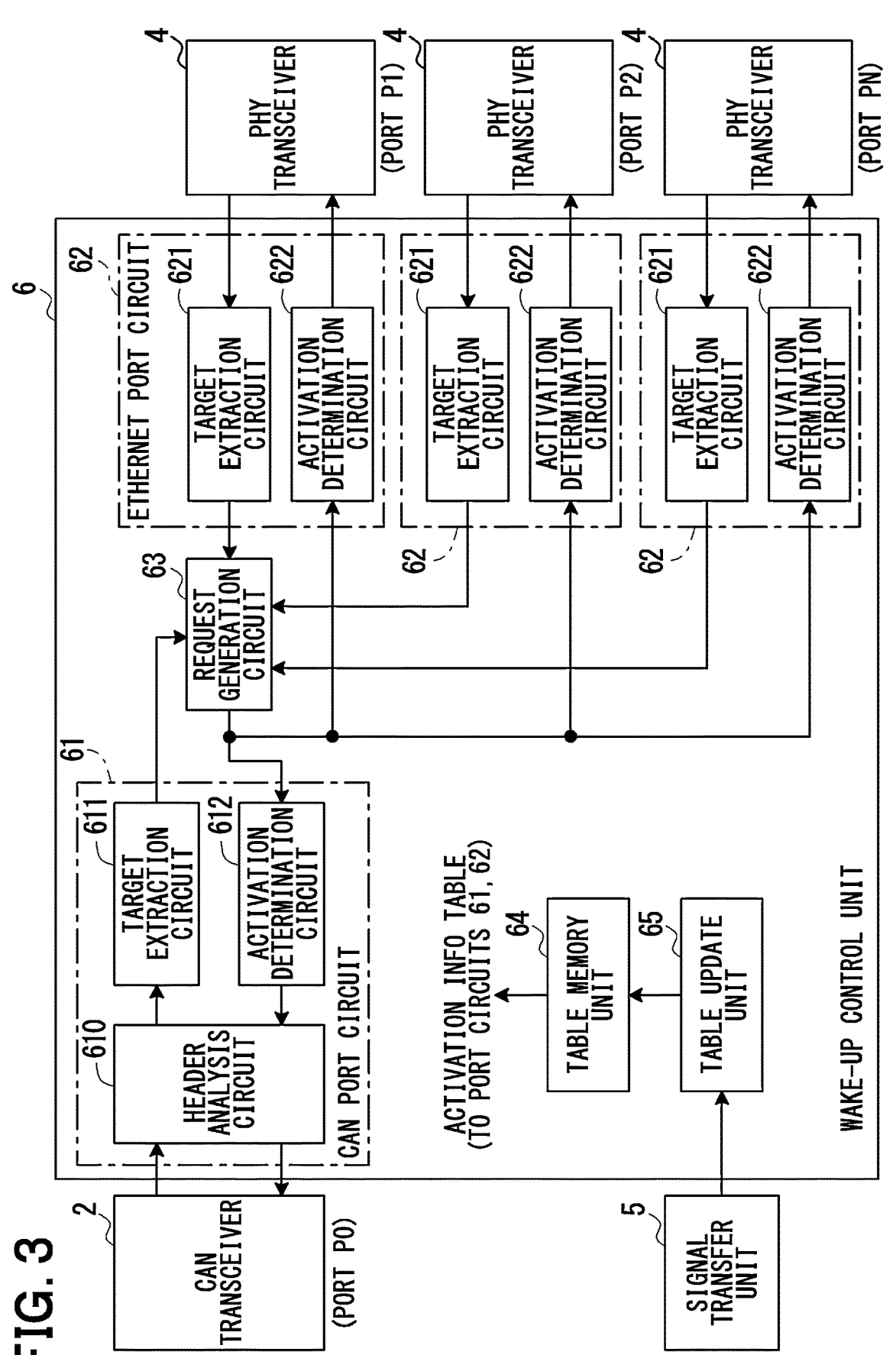
FIG. 3 is a block diagram showing a configuration of a wake-up control unit.

As shown in FIG. 3, the wake-up control unit 6 includes a CAN port circuit 61, multiple Ethernet port circuits 62, a request generation circuit 63, a table memory unit 64, and a table update unit 65.

The table memory unit 64 stores activation information table. As shown in FIG. 4, the activation information table is a collection of data in which the port numbers, the node identification data, and the PNI data are associated with each other.

The node identification data is information for identifying the nodes 72 and 82. The CAN nodes 72 may use the node IDs as the node identification data and the Ethernet nodes 82 may use the MAC addresses as the node identification data. The activation information table lists the node identification data of all of the nodes 72, 82.

The port numbers are information for identifying the ports to which the nodes 72 and 82 are connected. In this embodiment, the CAN nodes 72 are connected to the single CAN bus 71. Thus, the CAN nodes 72 have the same port number (i.e., port P0) in the activation information table. The Ethernet nodes 82 are connected respectively to different Ethernet transmission lines 81. Thus, the Ethernet nodes 82 have different port numbers (i.e., ports P1 to PN) in the activation information table. When the CAN bus 71 is multiple, different port numbers are assigned to the CAN nodes 72 depending on the CAN buses 71 to which the CAN nodes 72 are connected.

The PNI, which stands for Partial Network Information, data is formed of multiple bits to which activation groups are assigned respectively. The activation group is a group of nodes 72, 82 that is required to be collectively activated when one of the nodes 72, 82 in the group is activated. In the PNI data for one node 72, 82, a bit corresponding to the activation group to which the one node 72, 82 belongs is set to 1. Each of the nodes 72, 82 belongs to at least one of the activation groups, and may belong to multiple of the activation groups.

With reference to FIG. 3 again, the table update unit 65 executes table update processing and table setting processing in accordance with the data input from the signal transfer unit 5. The table update processing is processing of updating the activation information table stored in the table memory unit 64. The table setting processing is processing, when various types of activation information tables are available, of selecting and setting the activation information table to be used among the various types.

The CAN port circuit 61 includes a header analysis circuit 610, a target extraction circuit 611, and an activation determination circuit 612. The header analysis circuit 610 analyzes the header field of the digitized CAN frame that has input from the CAN transceiver 2 to determine whether the CAN frame is a wake-up signal. When the header analysis circuit 610 determines that the CAN frame is a wake-up signal, the header analysis circuit 610 outputs an activation instruction to the signal transfer unit 5. Additionally, the header analysis circuit 610 extracts the node ID of the node that has transmit the wake-up signal (i.e., the requesting node) from the header field of the CAN frame and outputs the extracted node ID to the target extraction circuit 611. The header analysis circuit 610 may be configured to omit outputting an activation instruction to the signal transfer unit 5 when the header analysis circuit 610 recognizes that the signal transfer unit 5 has been already activated.

The target extraction circuit 611 extracts the PNI data of the requesting node by referring to the activation information table according to the node ID extracted by the header analysis circuit 610. The target extraction circuit 611 outputs the extracted PNI data to the request generation circuit 63 as activation target data. The requesting node is the CAN node 72 which has transmitted the wake-up signal.

The activation determination circuit 612 calculates a logical product (i.e., AND operation) for each bit between the activation request data generated by the request generation circuit 63 and the PNI data of each of the CAN nodes 72 stored in the activation information table. If the calculated logical product of a certain node of the CAN nodes 72 is a non-zero value, the activation determination circuit 612 notifies the header analysis circuit 610 of the node ID of the certain node.

The header analysis circuit 610 generates a wake-up signal that indicates the activation request data corresponding to the node ID notified by the activation determination circuit 612 in the data field, and transmits the wake-up signal to the CAN bus 71 through the CAN transceiver 2. Alternatively, the processing of the activation determination circuit 612 may be omitted. In this case, a wake-up signal indicating the activation request data generated in the request generation circuit 63 in the data field is generated and transmitted.

Each of the Ethernet port circuits 62 includes a target extraction circuit 621 and an activation determination circuit 622. The port to which the Ethernet port circuit 62 of interest is connected is referred to as the own port. When the target extraction circuit 621 receives a detection notification from the PHY transceiver 4 of the own port, the target extraction circuit 621 refers to the activation information table according to the port number of the own port and extracts the PNI data of the requesting node. The target extraction circuit 621 outputs the extracted PNI data to the request generation circuit 63 as the activation target data. The requesting node in this case is the Ethernet node 82 that has transmitted the wake-up pulse.

The activation determination circuit 622 calculates a logical product (i.e., AND calculation) for each bit between the activation request data generated by the request generation circuit 63 and the PNI data of the Ethernet node 82 that is connected to the own port, which is stored in the activation information table. If the calculated logical product is a non-zero value, the activation determination circuit 612 outputs an activation instruction to the PHY transceiver 4 of the own port. The PHY transceiver 4 that has received the activation instruction transmits a wake-up pulse.

The request generation circuit 63 generates activation request data by calculating a logical sum (i.e., OR operations) for each bit among all pieces of activation target data output from the CAN port circuit 61 and the Ethernet port circuits 62. The request generation circuit 63 executes the processing at a predetermined obtaining cycle, and executes calculation of the logical sum on the activation target data generated during the preceding obtaining cycle.

1-2. Operation Example of Wake-Up Control Unit

A case where the relay device 1 receives wake-up signals from the three nodes N1 to N3 substantially the same time (i.e., during the same obtaining cycle or a predetermined obtaining period) will be described. The PNI data is formed of nine bits that represent nine activation groups G1 to G9, respectively.

Figure 5:
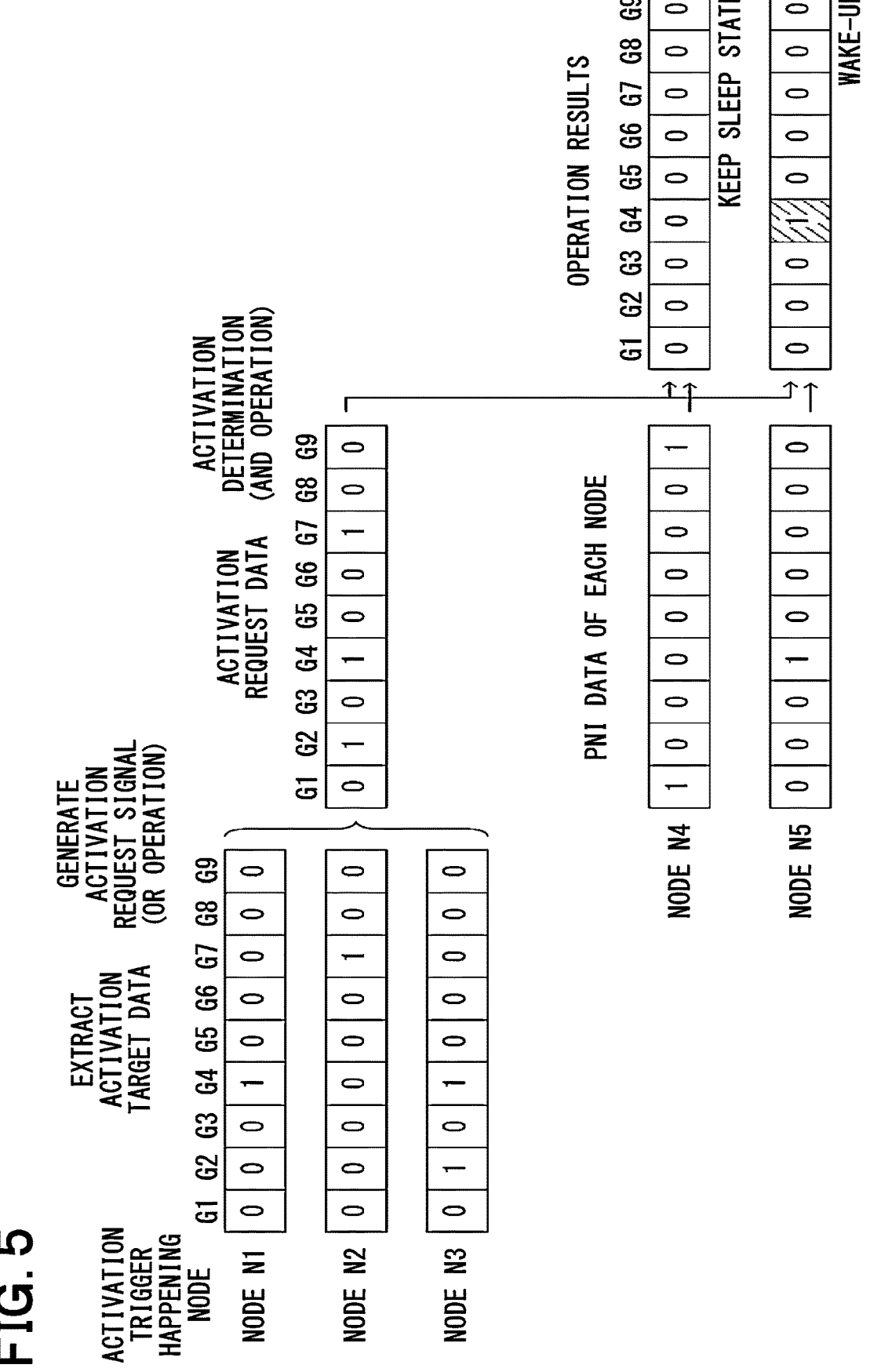
FIG. 5 is an explanatory diagram showing an operation of the wake-up control unit.

As shown in FIG. 5, the node N1 belongs to the activation group G4, the node N2 belongs to the activation group G7, and the node N3 belongs to the activation groups G2 and G4. In this case, the three pieces of the PNI data (i.e., activation target data) extracted from the activation information table are [000100000], [000000100], and [010100000]. The request generation circuit 63 calculate a logical sum on the three pieces of the activation target data to generate activation request data of [010100100].

When the node N4, which is a target of determining whether to activate, belongs to the activation groups G1 and G9, the PNI data of the node N4 is [100000001]. In this case, the logical product between the PNI data of the node N4 and the activation request data generated by the request generation circuit 63 is [000000000]. The node N4 does not belong to any one of the activation groups indicated in the activation request data and thus the logical product is zero. Thus, it is determined that wake-up of the node N4 is unnecessary. That is, the node N4 remains in the sleep state.

When the node N5, which is a next target of determining whether to activate, belongs to the activation group G4, the PNI data of the node N5 is [000100000]. In this case, the logical product between the PNI data of the node N5 and the activation request data generated by the request generation circuit 63 is [000100000]. The node N5 belongs to the activation group G4 that is one of the activation groups indicated in the activation request data and thus the logical product is a non-zero value. Thus, it is determined that wake-up of the node N5 is necessary. That is, a wake-up signal or a wake-up pulse is transmitted to the node N5, and the node N5 enters the wake-up state.

1-3. Processing

1-2-1. Wake-Up Transmission Processing

Figure 6:
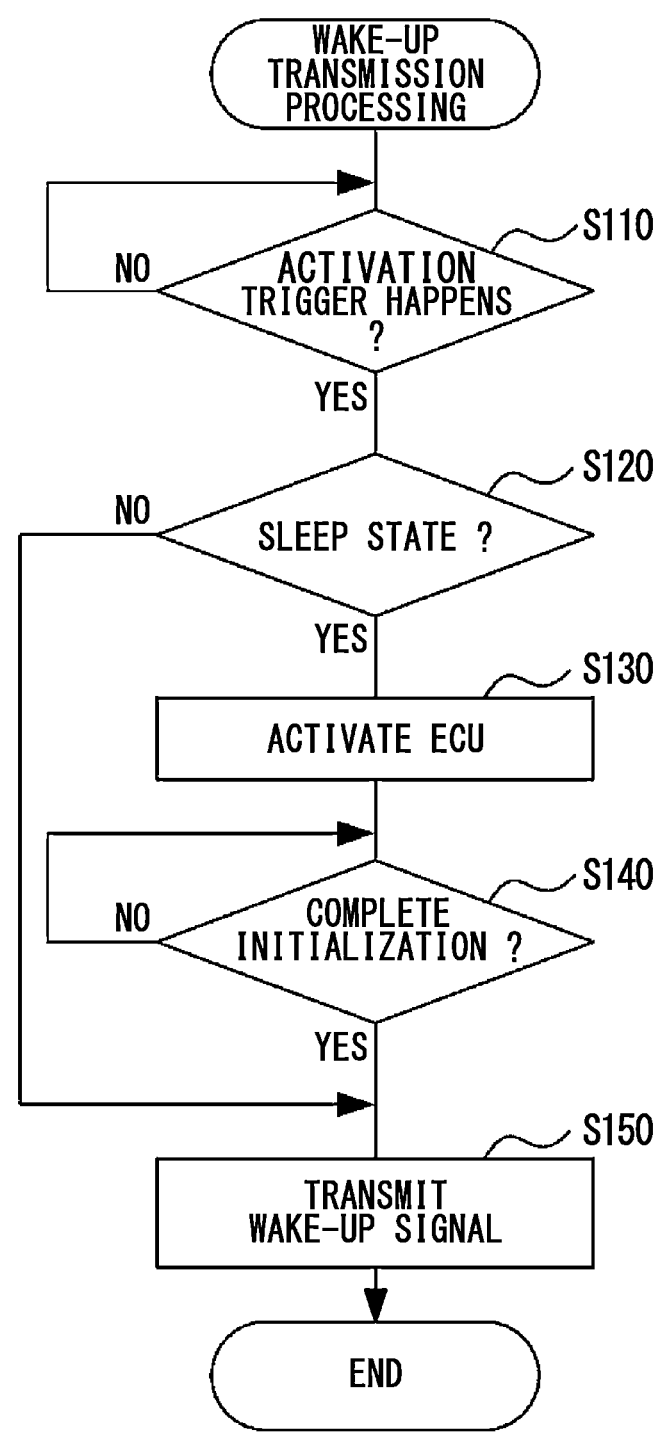
FIG. 6 is a flowchart of wake-up transmission processing executed by a constantly operating unit of a node.

The wake-up transmission processing executed by the constantly operating units of the nodes 72 and 82 will be explained using the flowchart of FIG. 6.

The wake-up transmission processing is repeatedly executed regardless of whether the operation state of the own node is the wake-up state or the sleep state. In the following description, the wake-up signal in the Ethernet node 82 represents a wake-up pulse.

In S110, the constantly operating unit determines whether an activation trigger has happened in its own node, and if the activation trigger has not happened, the constantly operating unit repeats the same step and waits until the activation trigger happens. If the activation trigger has happened, the processing is shifted to S120.

In S120, the constantly operating unit determines whether the own node is in the sleep state (i.e., the ECU is stopped). If the constantly operating unit determines that the own node is in the sleep state, the processing proceeds to S130. If the constantly operating unit determines that the own node is in the wake-up state, the processing proceeds to S150.

In S130, the constantly operating unit activates the ECU of the own node. The activated ECU starts an initialization process for making various processes ready for execution. The initialization process includes turning on the power of components of the node, starting the OS on the computer, and starting applications on the OS.

In S140, the constantly operating unit determines whether the ECU has completed the initialization process. If the initialization process has not been completed, the constantly operating unit repeats the same step and waits until the initialization process has completed. If the initialization process has been completed, the processing proceeds to S150.

In S150, the constantly operating unit instructs the ECU to transmit a wake-up signal, and the processing ends. In response to this instruction, the ECU executes processing of transmitting a wake-up signal.

1-3-2. Wake-Up Reception Processing

Figure 7:
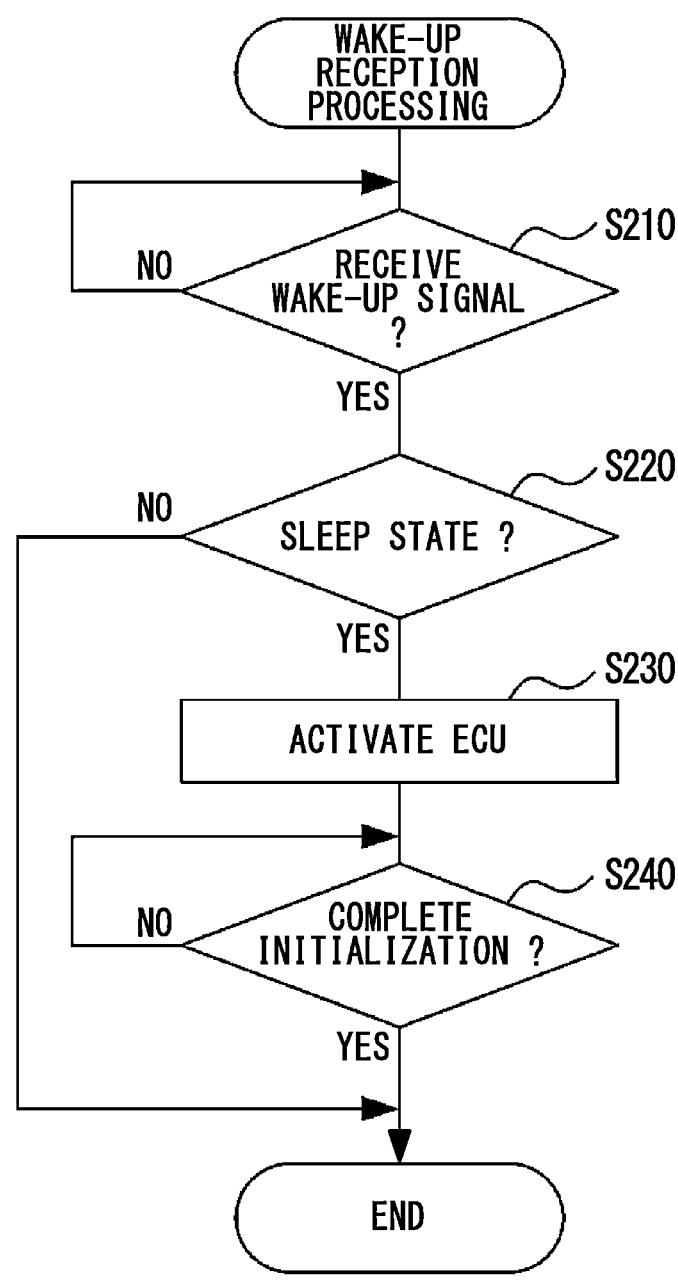
FIG. 7 is a flowchart of wake-up reception processing executed by the constantly operating unit of the node.

The wake-up reception processing executed in the constantly operating units of the nodes 72 and 82 will be explained with reference to the flowchart in FIG. 7. Similar to the wake-up transmission processing, the wake-up reception processing is repeatedly executed regardless of whether the operation state of the own node is the wake-up state or the sleep state.

In S210, the constantly operating unit determines whether a wake-up signal has been received, and if a wake-up signal has not been received, the constantly operating unit repeats the same step and waits until receiving a wake-up signal. If a wake-up signal has been received, the processing proceeds to S220. Here, the wake-up signal in the CAN node 72 is a CAN frame that identifies as a wake-up signal in the header field and indicates activation target data in the data field that designates the own node.

In S220, the constantly operating unit determines whether the own node is in the sleep state, and if the own node is in the sleep state, the processing proceeds to S230, and if the own node is not in the sleep state, i.e., if the own node is in the wake-up state, the processing ends.

In S230, the constantly operating unit activates the ECU of the own node. The activated ECU starts an initialization process for making various processes ready for execution. In S240, the constantly operating unit determines whether the initialization process has been completed, and if the initialization process has not been completed, the constantly operating unit repeats the same step and waits until the ECU completes the initialization process. If the initialization process has been completed, the processing ends.

The processing from S220 through S240 is similar to the processing from S120 through S140 described above.

1-2-3. Port Processing

Figure 8:
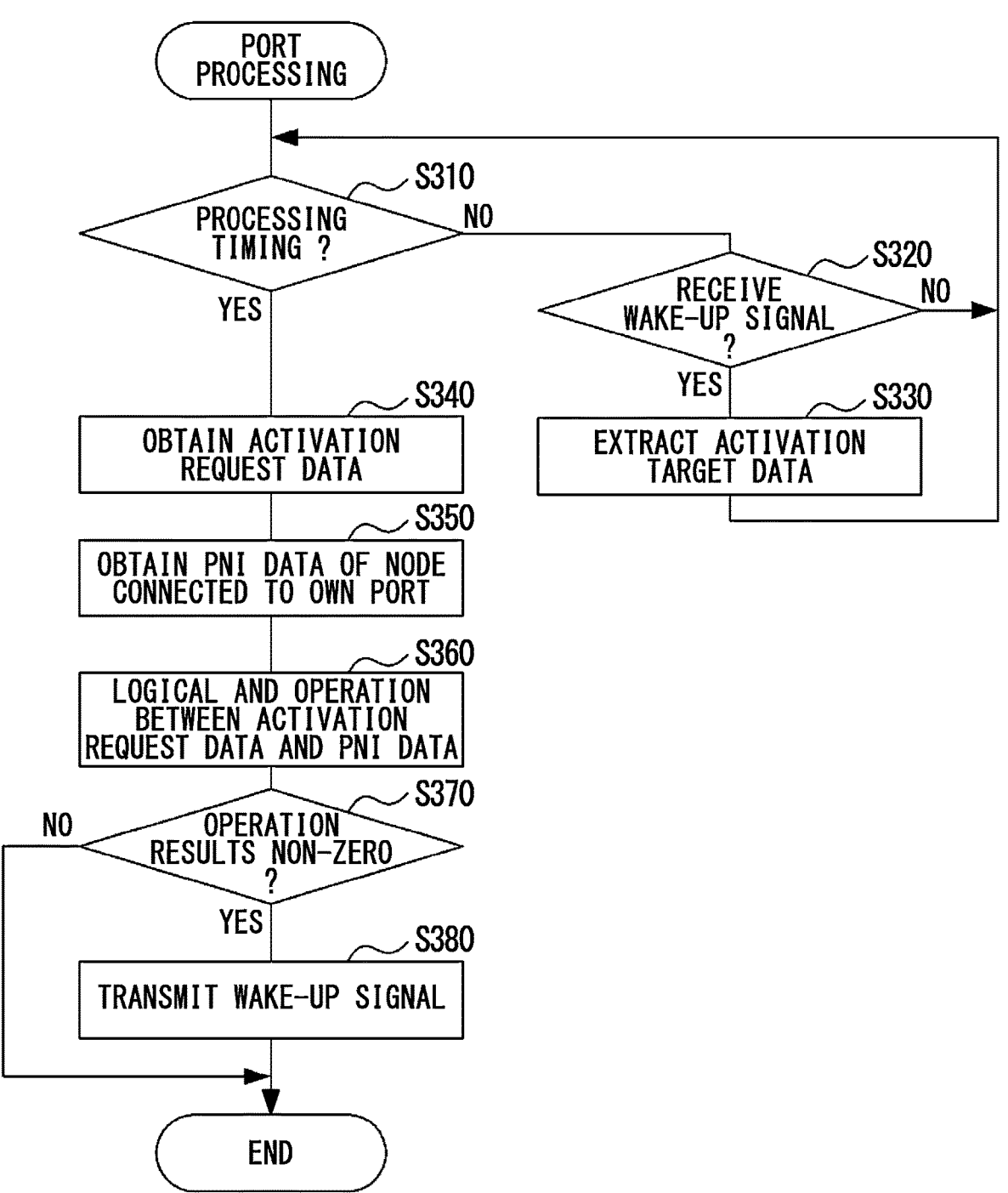
FIG. 8 is a flowchart of port processing executed by a CAN port circuit and an Ethernet port circuit of the wake-up control unit.

The port processing executed by the CAN port circuit 61 and the Ethernet port circuits 62 in the wake-up control unit 6 of the relay device 1 will be described with reference to the flowchart of FIG. 8. In the following description, when there is no need to distinguish between the CAN port circuit 61 and the Ethernet port circuits 62, they will simply be referred to as port circuits. The port circuits repeatedly execute the port processing regardless of whether the relay device 1 is in the sleep state or the wake-up state.

In S310, the port circuit determines whether it is timing for processing, and if it is timing for processing, the processing proceeds to S340, and if it is not timing for processing, the processing proceeds to S320. The processing timing is, for example, timing happening at the obtaining cycle described in the request generation circuit 63.

In S320, the port circuit determines whether a wake-up signal has been received, and if a wake-up signal has been received, the processing proceeds to S330, and if a wake-up signal has not been received, the processing returns to S310.

The CAN port circuit 61 determines whether a wake-up signal has been received based on whether the header analysis circuit 610 has determined that the CAN frame received by the CAN transceiver 2 is a wake-up signal. The Ethernet port circuit 62 determines whether a wake-up signal has been received based on whether the Ethernet port circuit has received a detection notification from the PHY transceiver 4.

In S330, the port circuit executes the process as the target extraction circuit 611, 621 that extracts activation target data and output the activation target data to the request generation circuit 63. Specifically, the port circuit refers to the activation information table using the node identification information of the requesting node that requests the wake-up, and extracts the PNI data of the requesting node as the activation target data. The CAN port circuit 61 uses the node ID indicated in the header field of the wake-up signal as the node identification information, and the Ethernet port circuit 62 uses the port number of the own port that has received the detection notification as the node identification information.

In S340, the port circuit obtains the activation request data generated by the request generation circuit 63. In S350, the port circuit obtains the PNI data of the node connected to its own port from the activation information table. In the case of the CAN port circuit 61, multiple nodes are connected to the own port. Thus, the CAN port circuit 61 obtains the PNI data of all of the nodes. In the case of the Ethernet port circuit 62, one node is connected to the own port. Thus, the Ethernet port circuit 62 obtains the PNI data of the one node.

In S360, the port circuit calculates a logical product between the activation request data obtained in S340 and the PNI data obtained in S350. The CAN port circuit 61 calculates a logical product between the activation request data and the obtained PNI data of each of the nodes.

In S370, the port circuit determines whether the logical product calculated in S360 is a non-zero value. If the logical product is a non-zero value, the processing proceeds to S380. If the logical product is zero, the port circuit ends the processing. In the CAN port circuit 61, if the logical product between the activation request data and any piece of the PNI data is a non-zero value, the processing proceeds to S380.

In S380, the port circuit selects, as a target node, at least one node among the nodes if the logical product between the activation request data and the activation target data for the at least one node is a non-zero value. Then, the port circuit instructs the selected target node to enter the wake-up state and ends the processing. Specifically, the CAN port circuit 61 outputs the node IDs of the target nodes to the header analysis circuit 610. The header analysis circuit 610 generates a wake-up signal for each of the target nodes, and transmits the generated wake-up signal to the CAN bus 71 via the CAN transceiver 2. In other words, transmitting wake-up signals each of which designates a respective one of the target nodes to the respective one of the target nodes corresponds to transmitting a wake-up signal designating the target node. Instead of generating wake-up signals respectively for the target nodes, the header analysis circuit 610 may transmit a single wake-up signal indicating the activation request data which is generated by the request generation circuit 63 and designates all of the target nodes. The Ethernet port circuit 62 outputs an activation instruction to the PHY transceiver 4 of the own port. Upon receiving the activation instruction, the PHY transceiver 4 transmits a wake-up pulse to the Ethernet transmission line 81 of the own port. In other words, selectively transmitting a wake-up pulse only to the Ethernet transmission line 81 to which the target node is connected corresponds to transmitting a wake-up signal designating the target node.

1-3-4. Table Update Processing

Figure 9:
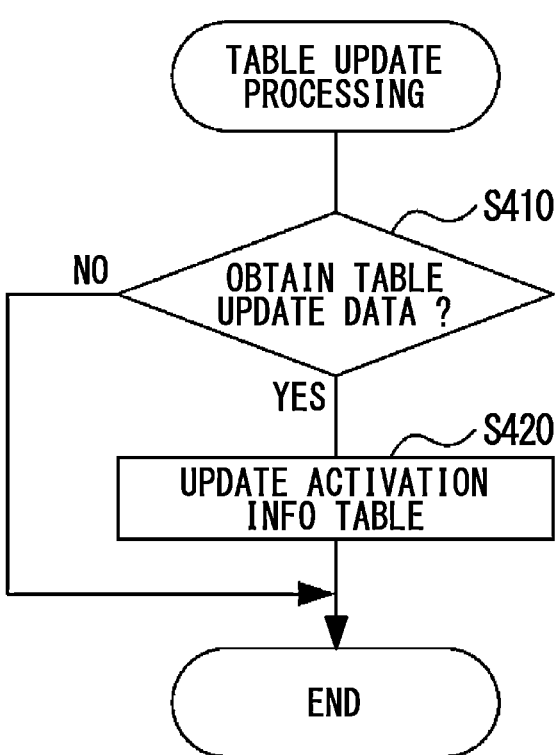
FIG. 9 is a flowchart of table update processing executed by a table update unit of the wake-up control unit.

The table update processing executed by the table update unit 65 of the wake-up control unit 6 will be explained using the flowchart in FIG. 9. The table update processing is processing of updating the activation information table stored in the table memory unit 64.

Figure 10:
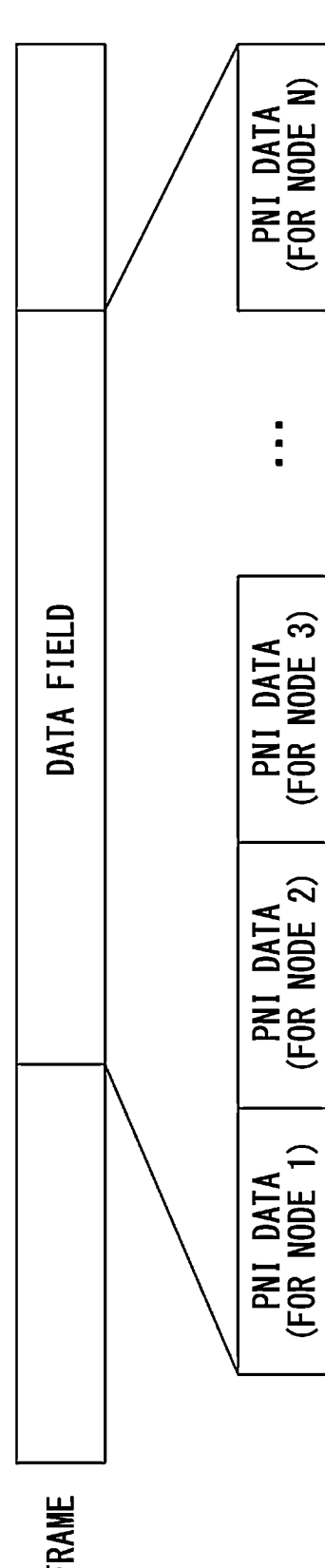
FIG. 10 is an explanatory diagram showing a configuration of an update frame.

At least one of the nodes 72 and 82 is configured to transmit a communication frame (hereinafter, referred to as an update frame) listing the PNI data of the nodes in the data field, as shown in FIG. 10. The update frame may be transmitted from one of the nodes 72 and 82. In this case, the data field may include the PNI data of all of the nodes 72 and 82. Alternatively, all of the nodes 72 and 82 may be configured to transmit the update frame. In this case, the update frame may only include the PNI data of the node 72, 82 transmitting the update frame.

The PNI data listed in the update frame may be represented by an integer multiple of 1 byte. For example, when the PNI data is 9 bits, the PNI data listed in the update frame is expressed as 2 bytes per node.

When the signal transfer unit 5 receives the update frame, the signal transfer unit 5 outputs the PNI data indicated in the data field of the update frame to the table update unit 65 of the wake-up control unit 6 as table update data. However, when all of the nodes individually transmit update frames, the signal transfer unit 5 associates the PNI data extracted from the data fields of the update frames with the node identification information of the nodes that has transmitted the update frames, and transmits the associated data to the table update unit 65 as the table update data. Further, when one node collectively transmits the PNI data of all of the nodes, the arrangement of the PNI data in the data field of the update frame may specify the node identification information.

The table update processing is repeatedly executed when the relay device 1 is in the wake-up state. That is, the table update processing is repeatedly executed when the signal transfer unit 5 is ready for executing processing related to the communication frame. As shown in FIG. 9, in S410, the table update unit 65 determines whether the table update data has been received from the signal transfer unit 5. If the
table update data has been received, the processing proceeds
to S420. If the table update data has not been received, the
processing ends.

In S420, the table update unit 65 updates the activation
information table stored in the table memory unit 64 with the
received table update data, and then ends the processing.

1-3-5. Table Setting Processing

Figure 11:
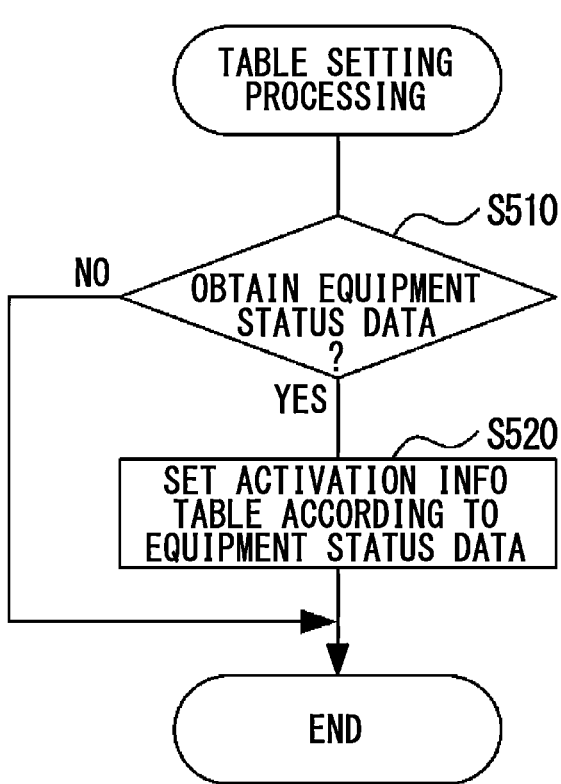
FIG. 11 is a flowchart of table setting processing executed by the table update unit of the wake-up control unit.

The table setting processing executed by the table update
unit 65 of the wake-up control unit 6 will be explained with
reference to the flowchart in FIG. 11. The table setting
processing is executed when various types of activation
information tables are prepared according to the vehicle
equipment status. The table setting processing is processing
of selecting which of the activation information tables is
used and setting the selected activation information table as
the activation information table to be used.

At least one of the nodes 72 and 82 is configured to
transmit a communication frame including data that indi-
cates an equipment status of the vehicle (hereinafter,
referred to as an equipment status data) in the data field. The
equipment status data may include data obtained via the
CAN bus 71, such as data indicating the type of the vehicle,
the grade of the vehicle, and the destination of the vehicle.

Similar to the table update processing, the table setting
processing is repeatedly executed when the relay device 1 is
in the wake-up state. As shown in FIG. 11, in S510, the table
update unit 65 determines whether the equipment status data
has been received from the signal transfer unit 5. If the
equipment status data has been received, the processing
proceeds to S520. If the equipment status data has not been
received, the processing ends.

In S520, the table update unit 65 selects the one activation
information table among the various types of the activation
information tables according to the equipment status data.
Then, the table update unit 65 sets the selected type of the
activation information table in the table memory unit 64 so
that the selected type of the activation information table can
be used by the CAN port circuit 61 and the Ethernet port
circuits 62, and then ends the processing.

1-4. System Operation

The representative operation of the in-vehicle network
system 100 will be explained with reference to the sequence
diagram in FIG. 12. In the following, a node in which an
activation trigger happens is called a trigger node, a node
that belongs to the same activation group as the trigger node
is called an activation target node, and a node that does not
belong to the same activation group as the trigger node is
called a not activation target node. Each of the trigger node,
the activation target node, and the not activation target node
may be the CAN node 72 or the Ethernet node 82.

Figure 12:
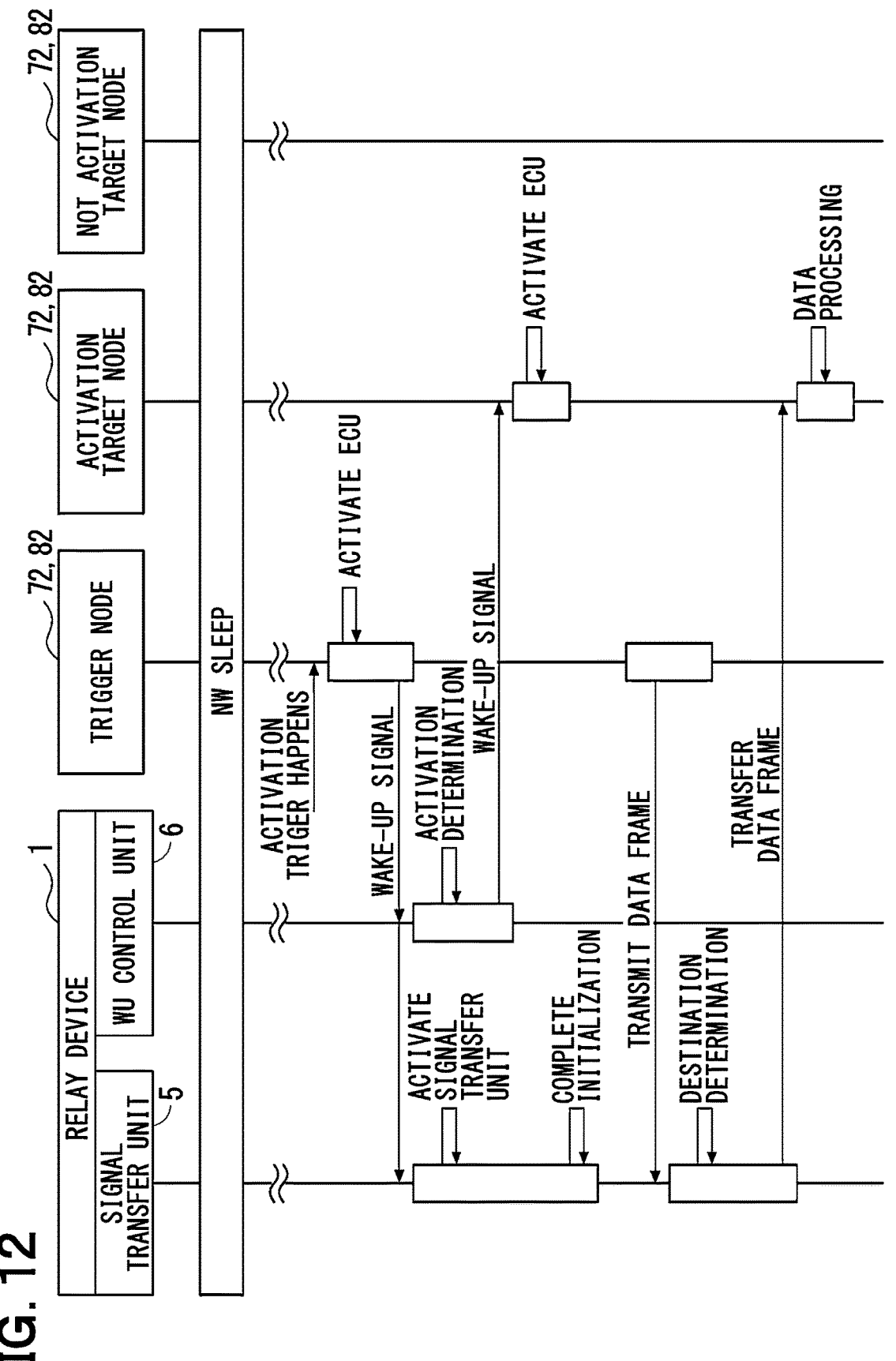
FIG. 12 is a sequence diagram showing a basic operation of the in-vehicle network system.

As shown in FIG. 12, it is assumed that in the initial state,
the relay device 1, the CAN node 72, and the Ethernet node
82 are all in the sleep state. When the trigger node detects the
activation trigger, the trigger node activates the ECU and
enters the wake-up state from the sleep state. The trigger
node that has entered the wake-up state transmits a wake-up
signal.

When the relay device 1 receives the wake-up signal, the
relay device 1 activates the signal transfer unit 5 and enters
the wake-up state from the sleep state. In parallel with
activating the signal transfer unit 5, the relay device 1
executes processing of transmitting wake-up signals for selectively activating the activation target nodes as a group
including one or more nodes. The relay device 1 transmits
the wake-up signal regardless of whether the initialization of
the signal transfer unit 5 has been completed, that is,
regardless of whether the transition of the signal transfer unit
5 to the wake-up state has been completed. In other words,
the relay device 1 transmits the wake-up signal without
depending on the operation of the signal transfer unit 5.

The activation target node that has received the wake-up
signal activates the ECU and enters the wake-up state from
the sleep state, thereby preparing for communication from
other activation target nodes that belong to the same acti-
vation group.

Thereafter, when the initialization of the signal transfer
unit 5 has been completed and the relay device 1 enters the
wake-up state, the activated trigger node transmits and
receive data frames to and from the activation target nodes.
Note that communication between the activated CAN nodes
72 is performed without through the relay device 1.

1-5. Effects

The first embodiment described above has the following
effects: (1a) When the wake-up signals happen in the mul-
tiple networks almost simultaneously, the relay device 1
extracts the activation target data of all of the requesting
nodes that transmit the wake-up signals. The activation
target data is the PNI data that indicates the activation
groups to which the requesting node belongs. The relay
device 1 synthesizes all of the extracted activation target
data to generate the activation request data collectively
indicating activation groups that are required to activate
together with the requesting nodes. The relay device 1
compares the PNI data of each of the nodes with the
activation request data to determine the target nodes and
selectively transmits wake-up signals not on a network basis
but on an activation group basis. Therefore, the relay device
1 can avoid unnecessary activation of the nodes that do not
need activation, thereby realizing power saving in the sys-
tem. Further, it is possible to prevent the wake-up signal
from being transmitted repeatedly to the node that has
already been activated.

(1b) In the relay device 1, the wake-up control unit 6 is
   configured as a hardware and operates independently of
   the signal transfer unit 5. Therefore, a wake-up signal
   can be transmitted to the target node before the acti-
   vation of the signal transfer unit 5 has been completed.
   Therefore, compared to a conventional device that
   transfers a wake-up signal using the signal transfer unit
   5 of the relay device 1, the time required to activate the
   entire system can be shortened.

(1c) The relay device 1 is configured to update the
   activation information table listing the PNI data of the
   nodes. Therefore, the relay device 1 can flexibly deal
   with the change of the activation group due to a cause
   such as a change in the system configuration.

(1d) The relay device 1 is configured to switch the
   activation information table to be used based on the
   equipment status data. Therefore, the relay device 1 can
   flexibly deal with a change in the activation group
   according to the grade of the vehicle and the equipment
   status of the optional equipment.

2. Second Embodiment

2-1. Difference From First Embodiment

Since the basic configuration of the second embodiment is
similar to that of the first embodiment, only differences from the first embodiment will be described below. Note that the same reference numerals as those in the first embodiment indicate the same configuration, and refer to the preceding descriptions.

In the second embodiment, a part of the configuration of a wake-up control unit 6a is different from that of the first embodiment. In detail, the CAN port circuit 61 in the first embodiment is configured to execute processing by referring to the header field of the CAN frame with the header analysis circuit 610. In contrast, a CAN port circuit 61a of the second embodiment differs from the first embodiment in that the CAN port circuit 61a is configured as a CAN decode circuit that refers not only to the header field of a CAN frame but also to the data field of the CAN frame to perform processing.

Figure 13:
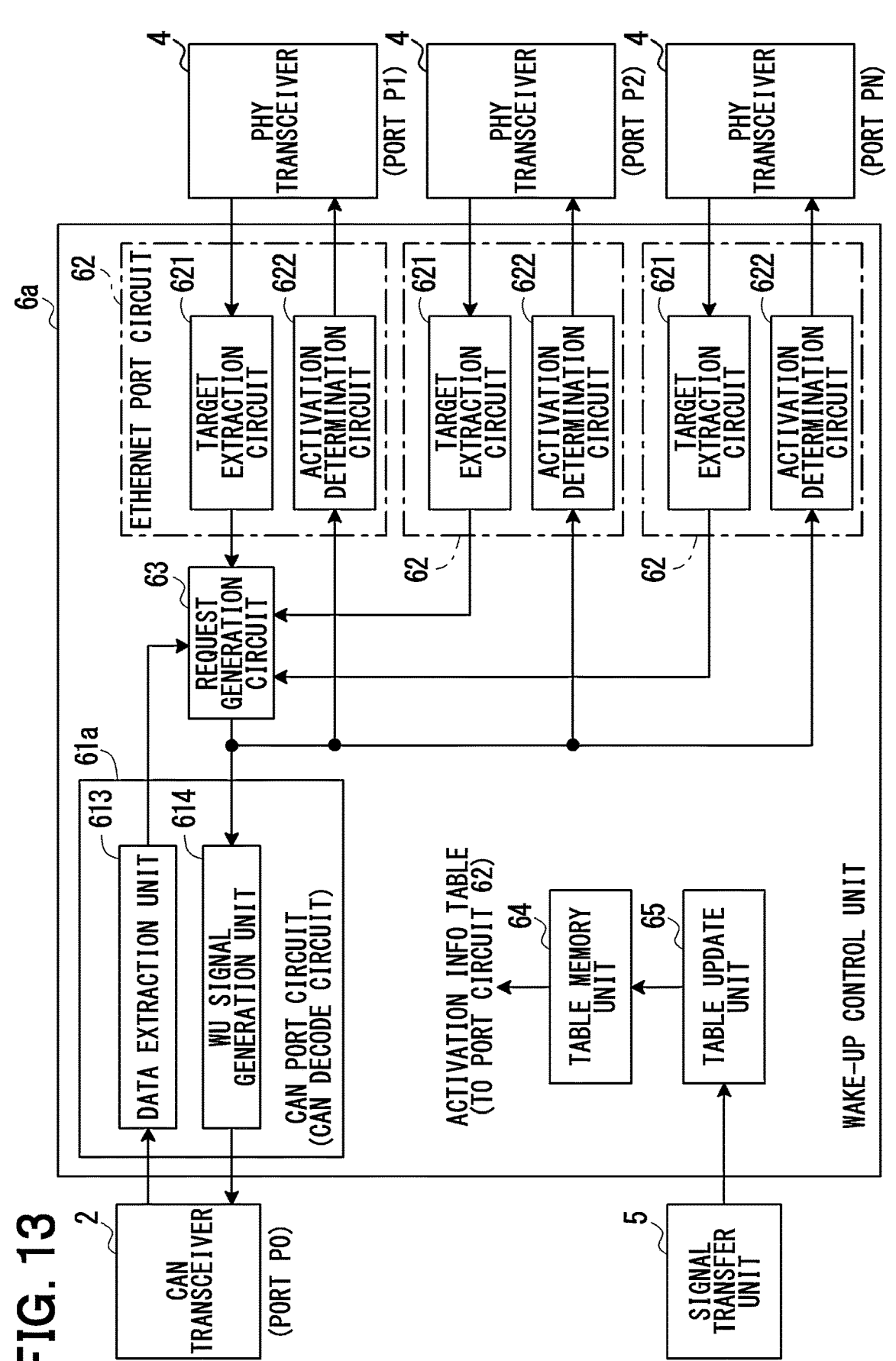
FIG. 13 is a block diagram showing a configuration of a wake-up control unit in a relay device according to a second embodiment.

As shown in FIG. 13, the CAN port circuit 61a configured by a CAN decode circuit includes a data extraction unit 613 and a wake-up signal generation unit 614. When the received CAN frame is a wake-up signal, the data extraction unit 613 extracts the PNI data from the data field, and outputs the extracted PNI data to the request generation circuit 63 as activation target data.

When the wake-up signal generation unit 614 obtains activation request data having non-zero value from the request generation circuit 63, the wake-up signal generation unit 614 generates a wake-up signal including the activation request data in the data field and transmits the generated wake-up signal to the CAN bus 71 via the CAN transceiver 2.

When the CAN node 72 receives the wake-up signal, the CAN node 72 refers to the activation request data indicated in the data field and compares the activation request data with the PNI data of the own node to determine whether to enter the wake-up state.

2-2. Processing

Figure 14:
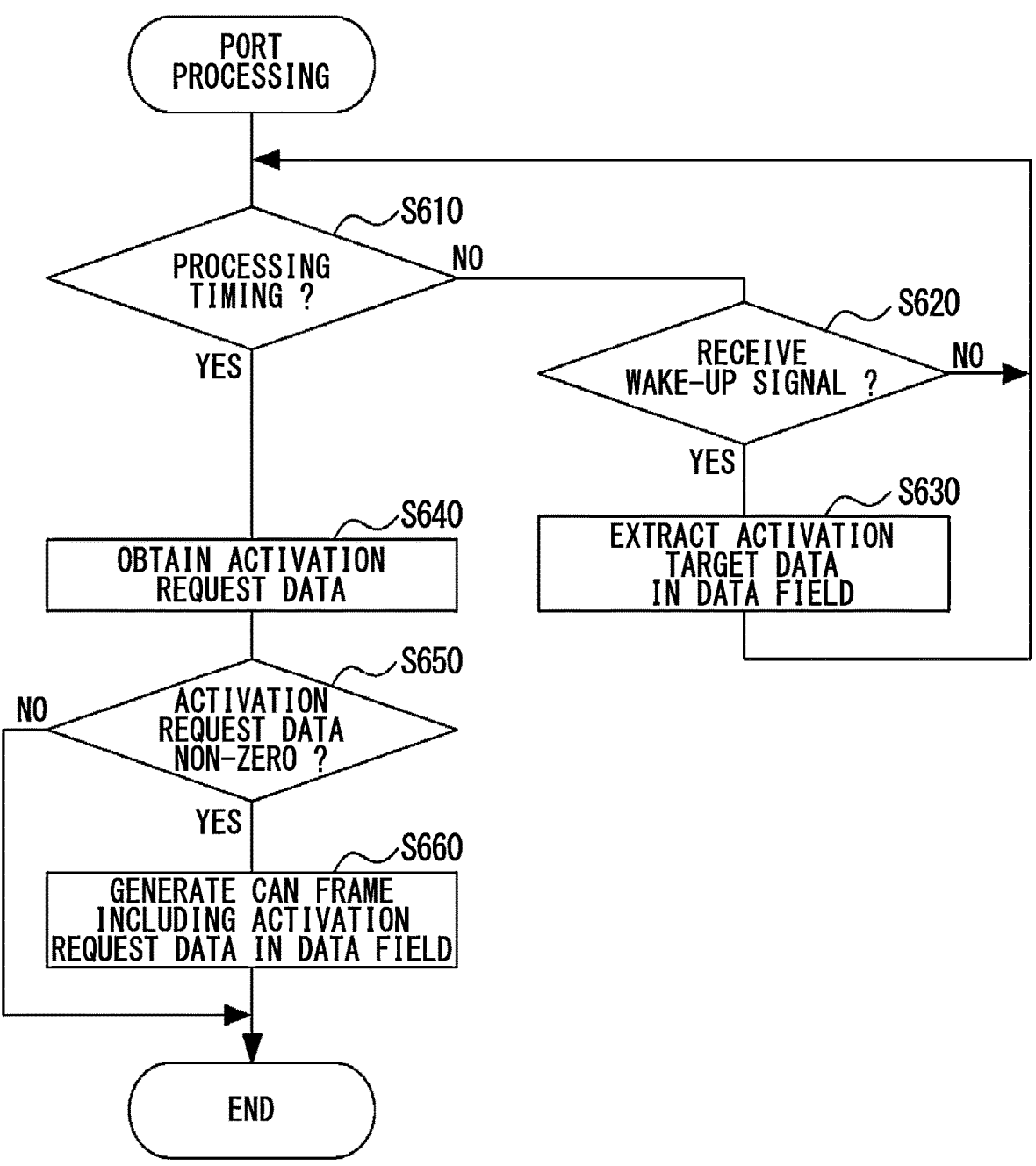
FIG. 14 is a flowchart of port processing executed by a CAN port circuit constituting a wake-up control unit of the relay device of the second embodiment.

The port processing performed by the CAN port circuit 61a will be explained using the flowchart in FIG. 14.

In S610, the CAN port circuit 61a determines whether it is timing for processing, and if it is timing for processing, the processing proceeds to S640, and if it is not timing for processing, the processing proceeds to S620.

In S620, the CAN port circuit 61a determines whether a wake-up signal has been received, and if a wake-up signal has been received, the processing proceeds to S630, and if a wake-up signal has not been received, the processing returns to S610.

The processes of S610 and S620 are similar to the processes of S310 and S320 in the CAN port circuit 61 described in the first embodiment. In S630, the CAN port circuit 61a obtains the PNI data from the data field of the wake-up signal, outputs the PNI data to the request generation circuit 63 as activation target data, and returns the processing to S610.

In S640, the CAN port circuit 61a obtains the activation request data generated by the request generation circuit 63. In S650, the CAN port circuit 61a determines whether the activation request data obtained in S640 has a non-zero value, and if the activation request data has a non-zero value, the processing proceeds to S660, and if the activation request data is zero, or not non-zero value, the processing ends.

In S660, the CAN port circuit 61a generates a CAN frame that identifies as a wake-up signal in the header field and includes the obtained activation request data in the data field, outputs the CAN frame to the CAN transceiver 2, and ends the processing.

2-3. Effects

The second embodiment described in detail above provides the effects (1a) through (1d) described in the first embodiment and the following effects in addition.

(2a) The CAN port circuit 61a transmits the activation request data to the CAN nodes 72 as a wake-up signal and each of the CAN nodes 72 determines, using the activation request data, whether to activate. Therefore, it is not necessarily to transmit wake-up signals individually and respectively to the CAN nodes, thereby reducing the amount of communication on the CAN bus 71 during the wake-up.

3. Other Embodiments

Whereas embodiments of the present disclosure are explained thus far, the present disclosure is not limited to embodiments mentioned above, and can be implemented with various modifications being made thereto.

(3a) In the above embodiments, different protocols are used in the first network 7 and the second network 8. However, the same protocol may be used in the first network 7 and the second network 8. Furthermore, the protocols used in the networks 7 and 8 are not limited to the CAN protocol and the Ethernet protocol. Any communication protocol can be used for the networks 7 and 8.

Figure 15:
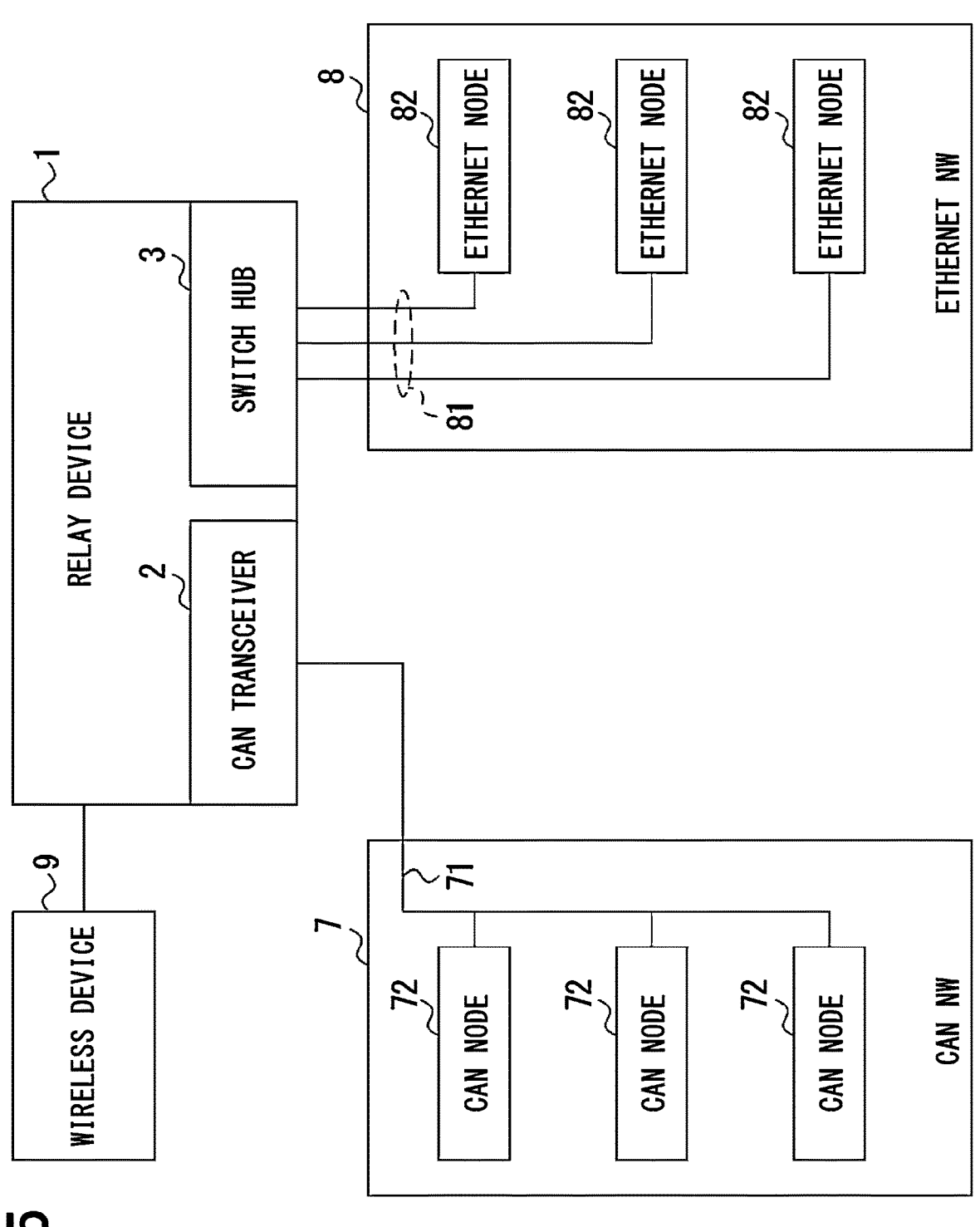
FIG. 15 is a block diagram showing another example of the configuration of an in-vehicle network system.
Figure 16:
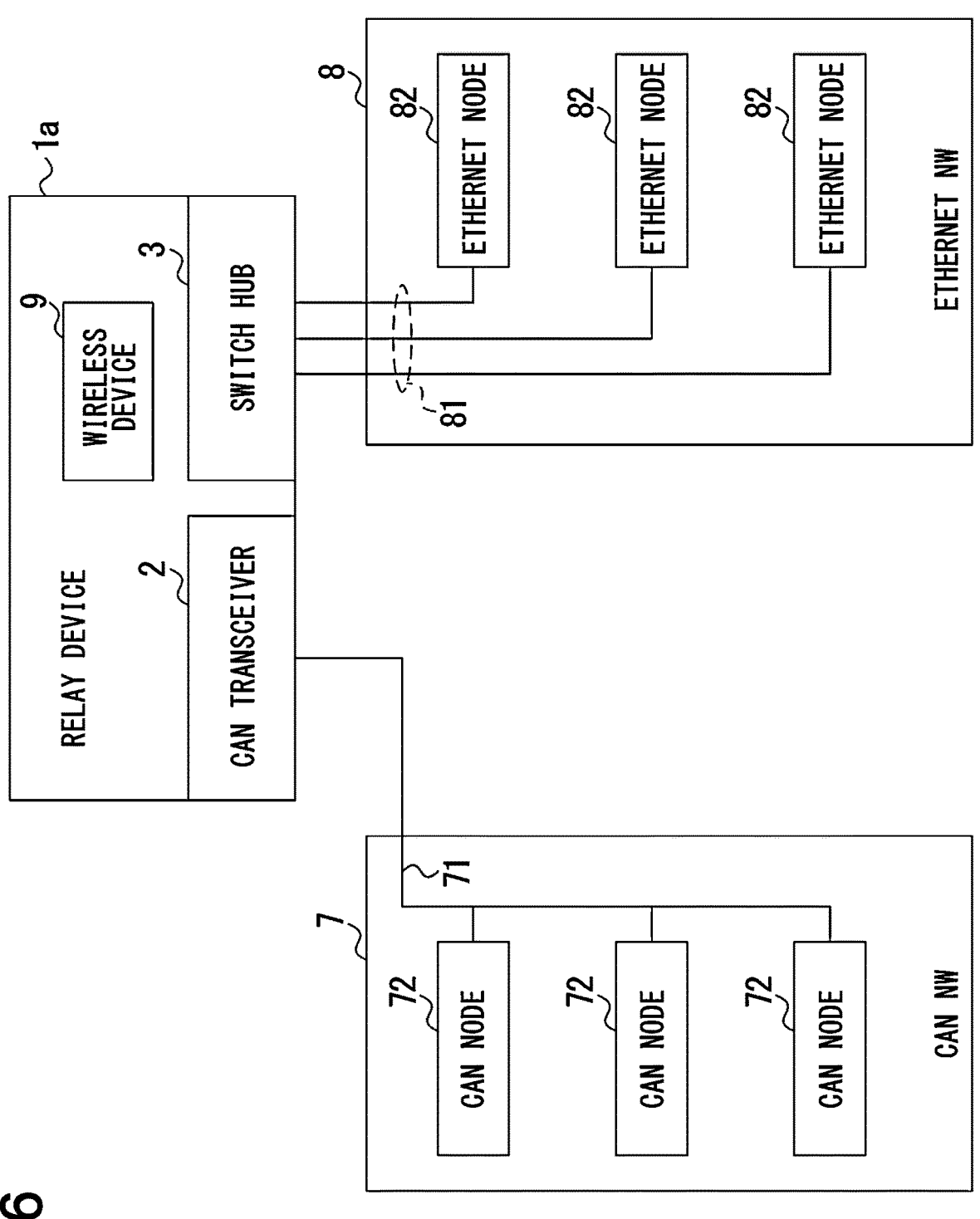
FIG. 16 is a block diagram showing another example of the configuration of an in-vehicle network system.

(3b) In the above embodiments, the wake-up control unit 6 includes the table update unit 65, but the signal transfer unit 5 may include the table update unit 65 in place of the wake-up control unit 6. (3c) In the above embodiment, a wake-up signal or a wake-up pulse is transmitted from the node 72, 82 where the activation trigger happens, but the present disclosure is not limited thereto. For example, similar to an in-vehicle network system 101 shown in FIG. 15, a wireless device 9 may be connected to the relay device 1, and the relay device 1 may receive a wake-up signal from an external device via the wireless device 9. Furthermore, the relay device 1 may be configured to detect an activation trigger caused by communication with the external device, and output a wake-up signal or a detection notification to the switch hub 3. In this case, the activation information table may further include PNI data that designates the wireless device 9 or an external device that communicates with the wireless device 9 as a node. The activation trigger detected by the wireless device 9 may include, for example, a program rewrite request via OTA from an external device, various requests from a digital key or a remote key, and the like. In addition, the activation information table may be updated from outside the vehicle using the wireless device 9 via OTA or a DDN controller. As illustrated in the in-vehicle network system 102 in FIG. 16, the wireless device 9 may be installed in the relay device 1.

Figure 17:
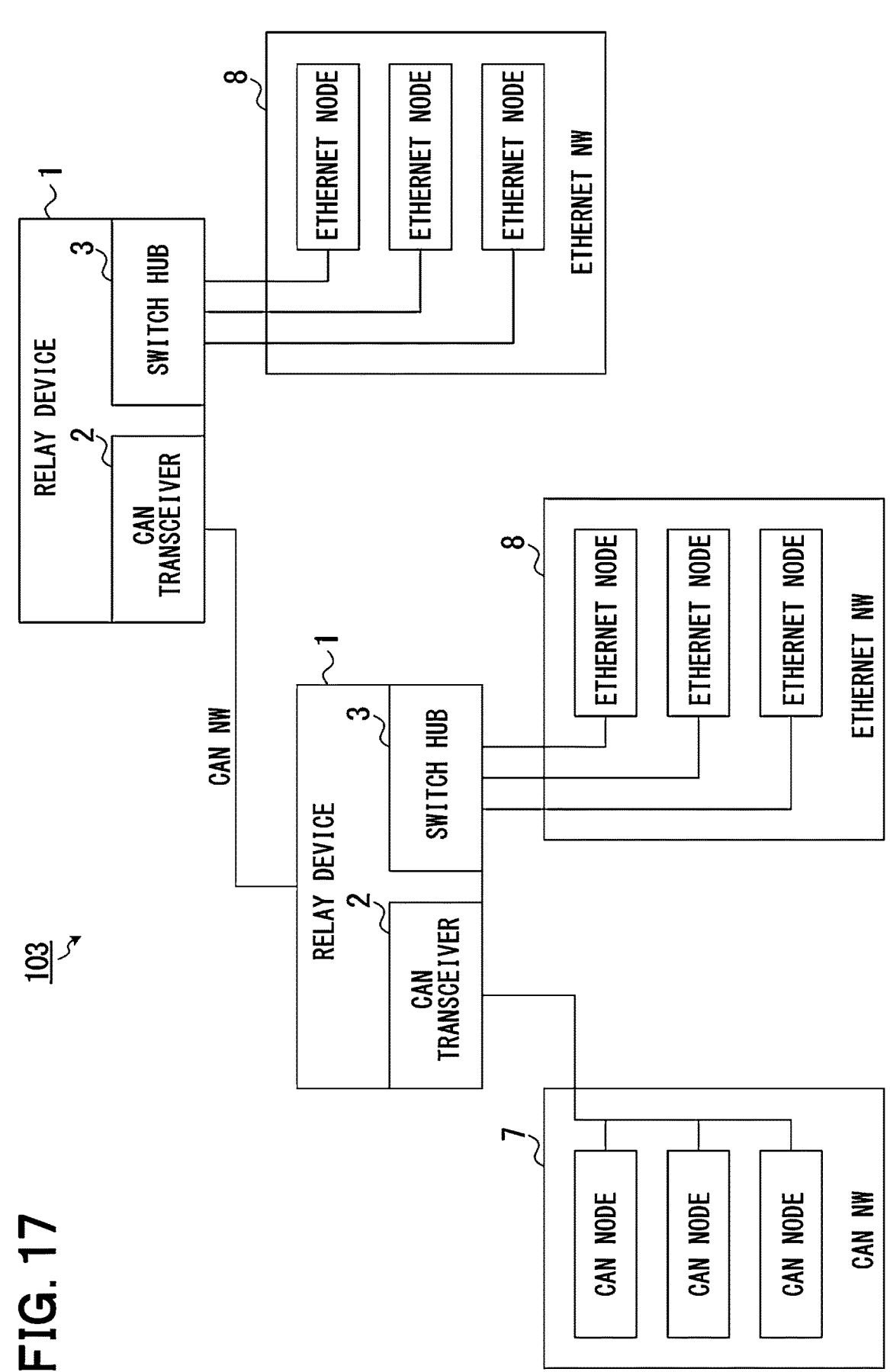
FIG. 17 is a block diagram showing another example of the configuration of an in-vehicle network system.

(3d) In the above embodiment, the single relay device 1 is provided. However, multiple relay devices 1 may be connected in a cascade manner, as illustrated in the in-vehicle network system 103 shown in FIG. 17. In addition, in FIG. 17, CAN is used as the protocol between the relay devices 1, but the present disclosure is not limited thereto.

(3e) The multiple functions of one component in the above embodiments may be implemented by multiple components, or a function of one component may be implemented by multiple components. Further, multiple functions of multiple components may be implemented by one component, or one function implemented by multiple components may be implemented by one component. A part of the configuration of the above embodiments may be omitted. Further, at least part of the configuration of the above-described embodiment may be added to or replaced with the configuration of another embodiment described above.

(3f) In addition to the above-described in-vehicle network system and the relay device, the present disclosure can also be realized in other forms such as a wake-up control method.

The invention claimed is:

1. An in-vehicle network system comprising:
a relay device connecting communication lines to each other; and
nodes each of which is connected to any one of the communication lines and configured to communicate with each other, wherein
each of the nodes has a wake-up state which is a normal operation state and a sleep state which is a low power consumption state where at least one of functions is disabled,
each of the nodes is configured to enter the wake-up state when the node in the sleep state receives a wake-up signal through the communication line,
at least one of the nodes is configured to transmit the wake-up signal when a predetermined activation condition is met,
the at least one of the nodes includes a first requesting node and a second requesting node,
activation target data is set for each of the nodes in advance,
the activation target data for one node indicates at least one other node that is required to activate together with the one node,
the relay device is configured to:
obtain the activation target data for the first requesting node and the activation target data for the second requesting node when receiving, during a predetermined obtaining period, the wake-up signals from the first and second requesting nodes through the communication lines;
synthesize the activation target data for the first requesting node and the activation target data for the second requesting node to generate activation request data collectively indicating the at least one other node for the first requesting node and the at least one other node for the second requesting node;
select, in accordance with the activation request data, a target node that is required to enter the wake-up state from the sleep state together with any one of the first requesting node and the second requesting node; and
transmit the wake-up signal that designates the target node.

2. The in-vehicle network system according to claim 1, wherein
the relay device is one of relay devices, and
the relay devices are interconnected in a cascade manner.

3. The in-vehicle network system according to claim 1, wherein the communication lines include a communication line utilizing a Controller Area Network (CAN) protocol or an Ethernet protocol.

4. The in-vehicle network system according to claim 1 further comprising
a wireless device configured to communicate with an external device, wherein
the relay device is further configured to receive the wake-up signal from the external device through the wireless device.

5. A relay device connecting communication lines to each other, each of the communication lines is connected to at least one of nodes, the relay device comprising:
exchange circuits installed respectively for the communication lines and configured to exchange signals through the communication lines;
a signal transfer unit configured to transfer a communication frame having received from any one of the exchange circuits to another one of the exchange circuits; and
a wake-up control unit, wherein
at least one of the nodes is configured to transmit a wake-up signal,
the at least one of the nodes includes a first requesting node and a second requesting node,
activation target data is set for each of the nodes in advance,
the activation target data for one node indicates at least one other node that is required to activate with the one node,
the wake-up control unit is configured to:
obtain the activation target data for the first requesting node and the activation target data for the second requesting node when receiving, during a predetermined obtaining period, the wake-up signals from the first and second requesting nodes through the exchange circuits;
synthesize the activation target data for the first requesting node and the activation target data for the second requesting node to generate activation request data collectively indicating the at least one other node for the first requesting node and the at least one other node for the second requesting node;
select, in accordance with the activation request data, a target node that is required to enter a wake-up state, which is a normal operation state, from a sleep state, which is a low power consumption state where at least one of functions is disabled; and
transmit the wake-up signal that designates the target node through at least one of the exchange circuits.

6. The relay device according to claim 5, wherein
the signal transfer unit has the wake-up state and the sleep state,
the signal transfer unit is configured to enter the wake-up state from the sleep state when the signal transfer unit in the sleep state receives the wake-up signal through at least one of the exchange circuits, and
the wake-up control unit is configured to transmit the wake-up signal without depending on an operation of the signal transfer unit.

7. The relay device according to claim 5, wherein
the wake-up control unit includes:
a table memory unit configured to store an activation information table that associates identification information of each of the nodes for identifying the nodes with the activation target data for each of the nodes,

a target extraction circuit configured to extract the activation target data associated with the first requesting node from the activation information table and the activation target data associated with the second requesting node from the activation information table when the exchange circuits receive, during the predetermined obtaining period, the wake-up signals from the first and second requesting nodes, a request generation circuit configured to synthesize the activation target data for the first requesting node and the activation target data for the second requesting node that are extracted by the target extraction circuit to generate the activation request data; and an activation determination circuit configured to determine whether each of the nodes is the target node by comparing the activation target data for the nodes with the activation request data.

8. The relay device according to claim 7, wherein the wake-up control unit is configured as a hardware.

9. The relay device according to claim 7, wherein the nodes are classified into activation groups, the activation target data for each of the nodes is formed of bits, each of the activation groups is assigned to a respective one of the bits, the activation target data for one node has at least one bit with a logical value 1, then the one node belongs to at least one activation group assigned to the at least one bit, the request generation circuit is configured to generate the activation request data by calculating a logical sum between the activation target data for the first requesting node and the activation target data for the second requesting node that are extracted during the predetermined obtaining period, and the activation determination circuit is further configured to:

calculate a logical product between the activation request data and the activation target data for each of the nodes, and select, as the target node, at least one node among the nodes if the logical product between the activation request data and the activation target data for the at least one node is a non-zero value.

10. The relay device according to claim 7, wherein the signal transfer unit is further configured to:

extract the activation target data from a data field of the communication frame flowing through the communication line; and output the activation target data to the wake-up control unit as table update data, and the wake-up control unit includes a table update unit configured to update the activation information table with the table update data.

11. The relay device according to claim 7, wherein the activation information table includes various types of the activation information table, the signal transfer unit is further configured to:

extract equipment status data, which indicates an equipment status of a vehicle including the relay device, from a data field of the communication frame flowing through the communication line; and output the equipment status data to the wake-up control unit, and the wake-up control unit is further configured to switch the various types of the activation information table according to the equipment status data.

12. The relay device according to claim 11, wherein the equipment status data includes at least one of a type, a grade, or a destination of the vehicle.

13. The relay device according to claim 7, wherein at least one of the communication lines is a communication line using a CAN protocol and connected to the first requesting node, the wake-up control unit includes:

a data extraction unit configured to:

extract the activation target data for the first requesting node from a data field of a Controller Area Network (CAN) frame that identifies as the wake-up signal in a header field of the CAN frame; and output the activation target data to the request generation circuit, a wake-up signal generation unit configured to:

generate the CAN frame that identifies as the wake-up signal in the header field and indicates the activation request data obtained from the request generation circuit in the data field; and transmit the generated CAN frame to the communication line using the CAN protocol.

14. The relay device according to claim 5, wherein the communication lines include communication lines using different communication protocols, and the signal transfer unit has a protocol conversion function.

15. The relay device according to claim 5 further comprising a wireless device configured to communicate with an external device and receive the wake-up signal from the external device.

* * * * *